United States Patent Office 3,632,553
Patented Jan. 4, 1972

3,632,553
STABILIZING POLYMERS WITH 2,2'-METHYLENE-BIS(6-ALKYL OR CYCLOALKYL)-3,4-XYLENOLS
Charles Gene Summers, Scott Depot, and Evan Johnson Young, St. Albans, W. Va., assignors to Monsanto Company, St. Louis, Mo.
No Drawing. Filed Aug. 21, 1968, Ser. No. 754,476
Int. Cl. C08f 45/58
U.S. Cl. 260—45.95           7 Claims

ABSTRACT OF THE DISCLOSURE

Polymers are stabilized against deterioration by the addition of a small amount of a compound represented by the formula

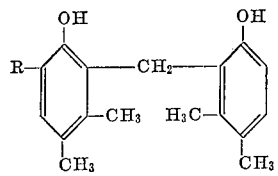

wherein R is alkyl or cycloalkyl.

This invention relates to the stabilization of polymers normally subject to oxidative deterioration. In particular, the invention relates to the stabilization of polymers without color buildup by incorporating therein certain bisphenols.

Bisphenols are used commercially as antioxidants. Some of these impart good antioxidant properties, but discoloration of the treated polymer restricts their use. Others give some protection against oxidative deterioration but are hampered by being too volatile to be useful during high temperature processing. As is well known, a highly desirable feature of an antioxidant is that it have a low volatility so that it remains admixed with the polymer during vulcanization and related process steps. Polymers of the nylon type possess a number of properties such as great toughness and high tensile strength which make them of great value in many applications. In certain applications, the nylon is subjected to heat treatments of various types to obtain improved properties. However, when nylon is subjected to the high temperatures necessary for securing these desired properties, extreme care must be taken to avoid undesirable discoloration and serious impairment of the strength of the fabric. Thus, there is a need for a stabilizer for polymers which is effective in protecting against oxidative deterioration and possessing non-discloring characteristics.

It is an object of this invention to provide polymers which are stable against oxidation deterioration. Another object is to provide polymers which are stabilized without color buildup. These and other objects and advantages of the invention will be apparent to those skilled in the art from the following description.

A notable advantage provided by this invention is that the polymers of this invention exhibit excellent non-staining and non-discoloring characteristics besides possessing resistance against deterioration by oxygen and ozone.

As used in the description and claims, the term "polymer" is employed in a generic sense to include natural rubber in its various forms, as for example latex, crepe, smoked sheets, gutta percha, balata, and cyclo rubbers, GR–S and GR–N rubbers, butyl rubber, methyl rubber, polybutene rubber, butadiene rubbers, piperylene rubbers, dimethyl-butadiene rubbers, polystyrene, polybutadiene, EPDM rubber, polyisobutylene, polyethylene, polypropylene, isobutylene-styrene copolymers, carboxymodified nitrile rubber, carboxy-modified styrene-butadiene copolymers, polymers of the nylon type, that is synthetic linear polyamides from polymerizable monoamino carboxylic acids or their amide-forming derivatives or from suitable diamines and suitable dicarboxylic acids or amide-forming derivatives of these compounds.

It has been found that certain bisphenols are very effective for the purposes of this invention. Such bisphenols are characterized by the presence of certain steric factors in the antioxidant molecule which minimize color buildup during aging and may be represented by the formula

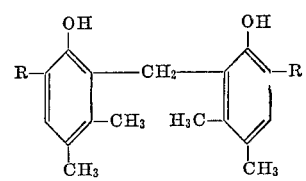

wherein R is alkyl or cycloalkyl. Alkyl will generally fall within the range of one to twelve carbon atoms; and cycloalkyl, within the range of five to eight carbon atoms. It is preferred that R be tertiary alkyl. The methyl groups ortho to the methylene bridge, on adjacent rings, due to proximity of the hydroxyl groups, prevent free rotation about the methylene bridge. The ortho-methyl substitution in turn inhibits co-planarity of the two rings during the oxidation of the molecule. Lack of coplanarity prevents color chromofore effects between the two-ring systems. The methyl groups in the para positions are also desirable. The amounts used in the polymer will vary depending upon the particular stock and the purpose of the compounder. In general, amounts within the range of 0.01 to 5.0 percent encompass the range normally used, and usually the amount will be 0.1 to 3 percent. Preferably the carbon atom of R which is attached to the aromatic ring is a tertiary carbon atom. Cycloalkyl groups are similar to branched-chain alkyl groups; and, if desired, R may be cycloalkyl, for example cyclopentyl, cyclohexyl, or alpha-methyl cyclohexyl. Examples of the bisphenol antioxidants useful in the stabilization of polymers normally susceptible to oxidation are:

2,2'-methylenebis(3,4,6-trimethylphenol)
2,2'-methylenebis(6-isopropyl-3,4,-xylenol)
2,2'-methylenebis(6-sec-butyl-3,4-xylenol)
2,2'-methylenebis(6-tert-butyl-3,4-xylenol)
2,2'-methylenebis(6-isobutyl-3,4-xylenol)
2,2'-methylenebis(6-sec-amyl-3,4-xylenol)
2,2'-methylenebis(6-tert-amyl-3,4-xylenol)
   2,2'-methylenebis(6-sec-hexyl-3,4-xylenol)
2,2'-methylenebis(6-sec heptyl-3,4-xylenol)
2,2'-methylenebis(6-sec-octyl-3,4-xylenol)
2,2'-methylenebis(6-tert-octyl-3,4-xylenol)
2,2'-methylenebis(6-cyclohexyl-3,4-xylenol)
2,2'-methylenebis(6-[alpha-methylcyclohexyl]-3,4-xylenol)
2,2'-methylenebis(6-cyclopentyl-3,4-xylenol)
2,2'-methylenebis(6-cyclooctyl-3,4-xylenol).

The bisphenols useful in this invention can be prepared by known procedures and some of the compounds are known. The following examples are typical of the preparation.

There is charged to a reactor 188 grams of 3,4-xylenol and 10 grams of Retrol clay. Retrol is the trademark of an acid-activated adsorbent earth made from mineral montmorillonite. The mixture is then heated to 100° C. and 94 grams (1.68 moles) of isobutylene added over a period of three hours. During the addition, the temperature is maintained between 95° and 100° C. After addition of isobutylene is complete, the clay is filtered off and the clear colorless liquid crystallizes on standing overnight. Yield of 6-tert-butyl-3,4-xylenol is 280 grams. To a solution containing 89 grams (0.5 mole) of this product, 100 grams of heptane, 10 grams of concentrated hydrochloric acid, and 0.5 ml. of wetting agent there is added dropwise, in 30 minutes at 40°–53° C., 25 grams (0.31 mole) of 37% aqueous formaldehyde. The mixture is heated 75 minutes at 50° to 60° C. and sampled for vapor phase chromatograph analysis. The product solution is cooled at 15° C., seeded with product crystals from the vapor phase chromatograph sample, and stirred one hour. After filtering, the product is washed with water, taken up in 200 ml. of hot heptane, and again washed with water. On cooling to 15° C., 2,2'-methylenebis(6-tert-butyl-3,4-xylenol) crystallizes out as white solid, melting at 148°–150° C. From 6-tert-amyl-3,4-xylenol, 2,2'-methylenebis (6-tert-amyl-3,4-xylenol) is prepared in similar manner.

A mixture of 68 grams (0.5 mole) of 2,4,5-trimethylphenol; 100 grams of Skellysolve C, trademark for a highly refined petroleum hydrocarbon fraction; ½ ml. of Santomerse S, trademark for alkyl aryl sulfonate; and 10 grams of concentrated hydrochloric acid is charged to a suitable reactor and heated with stirring to 40° C. There is added, over a period of one hour at 40°–55° C., 30 grams (0.37 mole) of 37% aqueous formaldehyde. There is then added 50 grams of Skellysolve C and the mixture heated an additional hour at 50°–60° C. Vapor phase chromatograph at 240° C. indicates about 90% conversion to product. The mixture is heated to 80° C. in one hour without dissolving the white solid. The mixture is allowed to stand overnight at 20°–25° C., the white solid is removed by filtration, washed wtih Skellysolve C and water, and dried in a vacuum oven at 20°–25° C. to a constant weight. The reaction yields 65 grams of 2,2'-methylenebis(3,4,6-trimethylphenol) as a white solid, M.P. 174°–175° C.

A mixture of 100 grams (0.61 mole) of 4,5-dimethyl-2-isopropylphenol, 100 grams of Skellysolve C, 10 grams of concentrated hydrochloric acid, and ½ ml. of Santomerse S is charged to a suitable reactor and 30 grams of aqueous formaldehyde added over a period of one hour at a temperature of 45°–55° C. with vigorous stirring. The mixture is stirred for three hours at 50°–60° C. and allowed to stand overnight at room temperature. The water layer is separated and the organic layer remaining is washed with aqueous sodium bicarbonate and then with water and cooled to −5° C., whereupon a white crystalline product separates. The product is collected by filtration, slurried in cold Skellysolve C, refiltered, and air dried. The reaction yields 10 grams of 2,2'-methylenebis (6-isopropyl-3,4-xylenol) as a white solid, M.P. 123° C. The filtrate contains a further quantity of product.

A mixture of 183 grams of 3,4-xylenol and 15 grams of Retrol clay is charged to a suitable reactor and then heated with stirring to 100° C. There is added, in two hours at 100° C., 144 grams (1.5 moles) of 1-methylcyclohexene-1, the reaction is stirred for six hours, cooled, and an additional 10 grams of clay is added. The reaction mixture is again heated and an additional 50 grams (0.5 mole) of 1-methylcyclohexene-1 is added in two hours at 100°–110° C. Heating is continued at 110°–130° C. for sixteen hours. The reaction mixture is filtered, diluted with benzene, washed well with aqueous sodium bicarbonate and then with water. The desired product is isolated by fractional distillation in vacuo. There is obtained 90 grams of 6-(alpha-methylcyclohexyl)-3,4-xylenol, B.P. 180°–186° C./12 mm.

There is charged to a 500 ml. reaction flask equipped with stirrer, reflux condenser, heating mantle, dropping funnel, and thermometer a mixture of 55 grams (0.25 mole) of 6-(alpha-methylcyclohexyl)-3,4-xylenol prepared as described above, 50 grams of Skellysolve C, ½ ml. Santomerse S, and 10 grams of concentrated hydrochloric acid. The vigorously stirred mixture is heated to 40° C. and 15 grams (0.18 mole) of 37% aqueous formaldehyde added in 45 minutes at 40°–50° C., with some heat of reaction being noted. The reaction mixture is stirred four hours at 50°–60° C. and left overnight at room temperature. It is then heated to 40° C., and an additional 10 grams of formaldehyde added over a thirty-minute period. After stirring four hours at 50°–60° C., a gas-liquid chromatograph indicates no further reaction. Cooling to −10° C. does not cause the product to crystallize. Therefore, the organic layer is taken up in an additional 100 grams of Skellysolve C, washed well with aqueous sodium bicarbonate and then with water, and vacuum stripped at 100° C./25 mm. to yield on cooling 48 grams of 2,2' - methylenebis(6-[alpha-methylcyclohexyl]-3,4-xylenol) as a lemon yellow glass. The product is insoluble in water but soluble in Skellysolve C, methanol, benzene, and ethanol.

In the following experiment, the color buildup of polybutadiene containing 2,2'-methylenebis(6-tert-butyl-3,4-xylenol) and other relatively non-discoloring commercial bisphenol antioxidants is determined. Solutions of a commercial solution-polymerized stereo-regular polybutadiene are prepared containing 0.5 part of test material per hundred parts of polymer. The solvent is evaporated from the solution polymer at room temperature until the weight is essentially constant and the samples milled at 50° C. with a mill setting of 0.008", then sheeted out between 1/16" and 1/8" thickness. The sheets are cut into 25 to 30 gram samples and aged at 70° C. and at 100° C. in a circulating air oven, and the color of the stocks noted. The results are shown in Table I.

TEST MATERIAL

Stock 1—Control—no antioxidant
Stock 2—2,2'-methylenebis(6-tert-butyl-3,4-xylenol)
Stock 3—2,2'-methylenebis(4-methyl-6-tert-butyl phenol)
Stock 4—Commercial stabilizer described as an alkylated bisphenol

TABLE I

| Stock | 1 | 2 | 3 | 4 |
|---|---|---|---|---|
| Mooney viscosities at 100° C. after aging at 70° C. for— | | | | |
| Initial | 55 | 53 | 54 | 54 |
| 2 days | 55 | 54 | 54 | 54 |
| 5 days | 133 | 55 | 55 | 54 |
| 10 days | 165 | 56 | 55 | 55 |
| Mooney viscosities at 100° C. after aging at 100° C. for— | | | | |
| 16 hours | 96 | 55 | 55 | 55 |
| 30 hours | 126 | 60 | 57 | 58 |
| 48 hours | 144 | 66 | 61 | 63 |
| Color of stock [1] after aging at 70° C. for— | | | | |
| Initial | C | C-VLY | A | LP |
| 2 days | C | C-VLY | A | P |
| 5 days | VLY | C-VLY | A | P |
| 10 days | Y | VLY | A | P |
| Color of stock [1] after aging at 100° C. for— | | | | |
| 16 hours | LY | VLY | A | P |
| 48 hours | Y | VLY | A | P |

[1] Color code.—C=Colorless; Y=Yellow; A=Amber; P=Pink; VLY ⁼ Very light yellow.

It is found that the gel content of Stock 1 increases from 0.4% to 75.6% after aging 30 hours at 100° C., whereas the gel content of Stock 2 does not increase at all. It will be noted that 2,2'-methylenebis(6-tert-butyl-3,4-xylenol) is superior to the two commercial non-discoloring antioxidants in preventing color buildup while the antioxidant efficiency, as measured by Mooney viscosity change with aging, is essentially equivalent. The properties of 2,2'-methylenebis(6-isopropyl-3,4-xylenol) in preventing color buildup are the same as those of the aforesaid 6-tert-butyl compound.

As a further specific embodiment of the invention illustrating the antidegradant properties, a rubber base composition is compounded comprising:

| | Parts by weight |
|---|---|
| Pale crepe rubber | 100 |
| Titanium dioxide | 50 |
| Zinc oxide | 25 |
| Clay | 15 |
| Stearic acid | 1 |
| Sulfur | 3 |
| Benzothiazolyl disulfide | 0.6 |
| Diphenyl guanidine | 0.15 |

Final stocks are prepared by adding to the base composition 2.0 parts by weight of test material as follows:

TEST MATERIAL

Stock 5—Control—no antioxidant
Stock 6—2,2'-methylenebis(6-tert-butyl-3,4-xylenol)

The stocks are cured by heating 40 minutes at 144° C. and then aged under various conditions and the ultimate tensile strength in pounds per square inch before and after aging observed. In the results recorded below, test-tube aging refers to results by the test-tube method, A.S.T.M. designation D 865–57, A.S.T.M. Standards, page 1453.

TABLE II

| | | Ultimate tensile strength | | |
|---|---|---|---|---|
| | | Test-tube aging | | Air-bomb aging, 7 hrs./121° C. under 80 lbs air pressure |
| Stock | Unaged | 24 hrs. at 100° C. | 48 hrs. at 100° C. | |
| 5 | 4,200 | 3,100 | 2,200 | 1,100 |
| 6 | 4,200 | 3,500 | 3,300 | 2,800 |

Comparable results are obtained with 2,2'-methylenebis(6-isopropyl-3,4-xylenol). The antioxidant strength of 2,2'-methylenebis(3,4,6-trimethylphenol) is slightly lower under comparable conditions.

To demonstrate the anti-exposure cracking properties, tests are conducted by the stress-relaxation method for measuring ozone cracking described by Decker and Wise in Rubber World, April 1962, pages 66–69. These are accelerated tests under dynamic conditions which simulate service conditions. The stocks are alternately stretched and relaxed on a reciprocating mechanism which imparts 25% strain to the test pieces 90 times each minute in an atmosphere which contains approximately 25 parts ozone per hundred million. The extent of cracking in a test piece is determined by measuring the force required to extend the test piece 100% before and after exposure to ozone. As the strips begin to crack, the number of stress-supporting rubber chains decreases and the force required to extend the strip 100% is reduced. The ratio of this force to the original force is calculated, and the ability of the rubber to resist ozone cracking is obtained by a comparison of these numbers. These ratios are referred to as percent of the original modulus.

TABLE III

| | Hours to indicated percent of original modulus | | |
|---|---|---|---|
| Stock | 90% | 80% | 70% |
| 5 | 3 | 7 | 15 |
| 6 | 12 | 41 | 118 |

Resistance to discoloration is evaluated on samples of the vulcanizates exposed for 72 hours in a fadeometer or under a sun lamp. The percentage of light reflected from the surface of the samples after exposure is recorded.

TABLE IV

| | Percent reflectance | | |
|---|---|---|---|
| | | After 72 hours | |
| Stock | Unexposed | Fadeometer | Sun lamp |
| 5 | 83 | 79 | 80 |
| 6 | 84 | 81 | 81 |

As a still further embodiment of the invention, 2,2'-methylenebis(6-tert-butyl-3,4-xylenol) is added to nylon. After high-temperature exposure at 290° C., nylon treated with 0.1% of 2,2'-methylenebis(6-tert-butyl-3,4-xylenol) retains good fiber strength. The fiber is resistant to yellow discoloration and retains whiteness on aging.

In another embodiment of the invention, low-density and high-density polyethylene, respectively, are admixed with 0.01% by weight of 2,2'-methylenebis(6-tert-butyl-3,4-xylenol) to produce compositions of increased stability toward oxidation upon heating at 192° C. as compared to an untreated control. Protection against oxidation for a longer time is obtained by increasing the amount of antioxidant to 0.03%.

To 100 parts by weight of a batch of low-pressure polypropylene, 0.03 parts by weight of 2,2'-methylenebis(6-tert-butyl-3,4-xylenol) is added to produce a stabilized polypropylene resistant to the deteriorative effects of heat.

To carboxylated styrene-butadiene copolymer latex of 48 to 50% solids content suitable for use in rug backing is added 0.75% of the dry-rubber content of 2,2'-methylenebis(6-tert-butyl-3,4-xylenol). A film is cast on glass, and the dry film heated at 132° C. in an oven for 116 hours. The aged film is lighter in color than an unprotected film and is still pliable and elastic. Addition of the same compound to white pigmented styrene-butadiene copolymer rubber in an amount of 2% of the rubber hydrocarbon causes no discoloration and provides a composition more resistant to oxidation than an untreated control.

The product, 2,2'-methylenebis(6-dodecyl-3,4-xylenol), is a very viscous liquid. The intermediate, 6-dodecyl-3,4-xylenol, is conveniently prepared from propylene tetramer using sulfuric acid as a catalyst. A mixture of 244 grams of 3,4-xylenol and 362 grams of propylene tetramer is stirred and heated to 60° C., at which temperature 20 grams of concentrated sulfuric acid is added. The reaction mixture is heated to about 82° C. over a period of about one hour and heating continued at 80° to 82° C. for about five hours. The reaction mixture is then filtered, washed with water dilute sodium hydroxide, and again with water and dried over sodium sulfate. The low-boiling constitutents are removed by distillation, first by heating up to 100° C. at 46 mm. pressure and then to 166° C. at 9 mm. pressure. The 6-dodecyl-3,4-xylenol obtained as the residue is a dark amber liquid weighing 107 grams. Condensation of aqueous formaldehyde, concentrated hydrochloric acid, and 6-dodecyl-3,4-xylenol in the manner previously described yields 2,2'-methylenebis(6-dodecyl-3,4-xylenol).

Alkylating 3,4-xylenol with diisobutylene using sulfuric acid catalyst yields 6-tert-octyl-3,4-xylenol as a white crystalline solid, M.P. 90° C. Condensation of aqueous formaldehyde, concentrated hydrochloric acid, and 6-tert-octyl-3,4-xylenol in like manner yields 2,2'-methylenebis (6-tert-octyl-3,4-xylenol) as a white crystalline solid, M.P. about 155° C.

The product, 2,2' - methylenebis(6 - cyclooctyl-3,4-xylenol), is initially obtained as a very viscous liquid which hardens on standing. The intermediate, 6-cyclooctyl-3,4-xylenol, is prepared by mixing 183 grams of 3,4-xylenol and 20 grams of Retrol clay, heating and stirring to 80° C., and adding, over a period of about 135 minutes at 80° to 105° C., 190 grams of cyclooctene. Heating and stirring are continued for about two and one-fourth hours at 100° to 105° C. The reaction mixture is then cooled, dissolved in about 400 grams of Skellysolve C, and the clay catalyst removed by filtration. The filtrate is washed with sodium bicarbonate solution and then water until the washings are neutral. The solvent is removed by distillation and the residue fractionated. There is collected 207 grams of 6-cyclooctyl-3,4-xylenol, B.P. 200°–205° C. at 8 mm. pressure, as a viscous, colorless liquid. Condensation of aqueous formaldehyde, concentrated hydrochloric acid, and 6-cyclooctyl-3,4-xylenol as above yields 2,2'-methylenebis(6-cyclooctyl-3,4-xylenol).

The intermediates possess significant antioxidant properties, and the herein described 6-substituted-3,4-xylenols in which the substituent in the 6-position contains seven or more carbon atoms have sufficiently high boiling points to make them feasible antioxidants for preserving substances which must withstand high processing temperatures, for example 100° C.

It is intended to cover all changes and modifications of the examples of the invention herein chosen for purposes of disclosure which do not constitute departures from the spirit and scope of the invention. The matter contained in each of the following claims is to be read as part of the general description of the present invention.

What is claimed is:

1. A synthetic conjugated diene rubber, normally susceptible to oxidation, stabilized by having incorporated therein a small antioxidant quantity of a compound having the formula

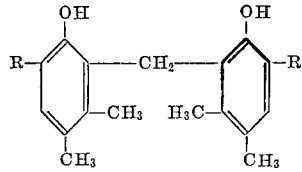

where R is alkyl branched at the carbon attached to the ring containing from three to twelve carbon atoms or cycloalkyl of five to eight carbon atoms.

2. The rubber composition of claim 1 wherein the rubber is solution polymerized conjugated diene rubber.

3. The rubber composition of claim 1 wherein the rubber is polybutadiene and R is branched chain alkyl containing from three to eight carbon atoms.

4. The rubber composition of claim 1 wherein the stabilizer is 2,2'-methylenebis(6-[alpha-methylcylcohexyl]-3,4-xylenol).

5. The rubber composition of claim 3 wherein the stabilizer is 2,2'-methylenebis(6-tert-butyl-3,4-xylenol).

6. The rubber composition of claim 3 wherein the stabilizer is 2,2'-methylenebis(6-isopropyl-3,4-xylenol).

7. The rubber composition of claim 3 wherein the stabilizer is 2,2'-methylenebis(6-t-octyl-3,4-xylenol).

References Cited
UNITED STATES PATENTS

| | | | |
|---|---|---|---|
| 2,862,976 | 12/1958 | Dubbs et al. | 260—45.95 |
| 3,211,652 | 10/1965 | Hinkamp et al. | 260—45.95 |
| 3,221,060 | 11/1965 | Albert et al. | 260—45.95 |

HOSEA E. TAYLOR, Primary Examiner

U.S. Cl. X.R.

260—810, 814